(12) United States Patent
Knobel et al.

(10) Patent No.: US 8,944,685 B2
(45) Date of Patent: Feb. 3, 2015

(54) MOVEMENT UNIT FOR A MACHINE TOOL AND MACHINE TOOL WITH SUCH A MOVEMENT UNIT

(71) Applicant: TRUMPF Sachsen GmbH, Neukirch (DE)

(72) Inventors: Carsten Knobel, Sohland (DE); Gunter Harnisch, Koenigsbrueck (DE); Stefan Krause, Wilthen (DE)

(73) Assignee: TRUMPF Sachsen GmbH, Neukirch (DE)

( * ) Notice: Subject to any disclaimer, the term of this patent is extended or adjusted under 35 U.S.C. 154(b) by 5 days.

(21) Appl. No.: 13/901,701

(22) Filed: May 24, 2013

(65) Prior Publication Data
US 2014/0332654 A1 Nov. 13, 2014

(30) Foreign Application Priority Data
May 24, 2012 (EP) ..................................... 12169323

(51) Int. Cl.
*F16C 29/12* (2006.01)
*B23Q 1/58* (2006.01)
*B23Q 1/01* (2006.01)

(52) U.S. Cl.
CPC ... *B23Q 1/58* (2013.01); *B23Q 1/01* (2013.01)
USPC .............................................. 384/9; 384/57

(58) Field of Classification Search
CPC ....... F16C 29/126; F16C 29/001; F16C 29/04
USPC .......................................... 384/9, 38–40, 57
See application file for complete search history.

(56) References Cited

U.S. PATENT DOCUMENTS

| | | | |
|---|---|---|---|
| 3,790,233 A | 2/1974 | Polidor | |
| 6,164,828 A | 12/2000 | Herrmann et al. | |
| 6,372,179 B1 | 4/2002 | Marcato | |
| 6,764,218 B2 * | 7/2004 | Kanamaru et al. | 384/38 |
| 6,842,961 B2 * | 1/2005 | Forlong | 29/464 |
| 6,969,199 B2 * | 11/2005 | Moshammer | 384/57 |
| 2009/0110336 A1 | 4/2009 | Niedermeyer et al. | |

FOREIGN PATENT DOCUMENTS

| | | |
|---|---|---|
| EP | 0935511 | 9/2002 |
| GB | 2218121 A | 11/1989 |

* cited by examiner

*Primary Examiner* — Thomas R Hannon
(74) *Attorney, Agent, or Firm* — Fish & Richardson P.C.

(57) ABSTRACT

A movement unit for a machine tool comprises a supporting structure movable in a first direction for supporting a functional unit of the machine tool, with two longitudinal guides extending in the first direction which are offset relative to one another in a transverse second direction. A guide unit is mounted on each longitudinal guide to be relatively movable in the first direction and not the second direction. A bearing structure connects the supporting structure to one of the guide units to be not relatively movable in the first direction and movable in the second direction. The bearing structure comprises a bearing receptacle having a receptacle wall extending in the second direction, and a bearing projection which engages the bearing receptacle. The bearing projection and the receptacle wall are supported against one another to prevent their relative motion in the first direction and are movable in the second direction.

12 Claims, 5 Drawing Sheets

MOVEMENT UNIT FOR A MACHINE TOOL AND MACHINE TOOL WITH SUCH A MOVEMENT UNIT

CROSS REFERENCE TO RELATED APPLICATION

Under 35 U.S.C. §119(a), this application claims the benefit of a foreign priority application filed in the European Patent Office, serial number 12 169 323.8, filed May 24, 2012, the entire contents of which are hereby incorporated by reference.

TECHNICAL FIELD

The invention relates to a machine tool with a movement unit.

BACKGROUND

A movement unit for a machine tool is disclosed in EP 0 935 511 A1. The prior art relates to a machine tool with a supporting structure in the form of a machine gantry, driven in a direction of travel by two linear motors at the longitudinal ends of the machine gantry. In this case, the machine gantry is supported with each of its longitudinal ends on a feed slide, which is in turn connected with the movable part in the direction of travel of the linear motor in question. To guide the machine gantry in the direction of travel, longitudinal guides extending in the direction of travel are provided for the feed slides, the longitudinal guide for the one feed slide being spaced transversely of the direction of travel from the longitudinal guide of the other feed slide. On the one feed slide the machine gantry is mounted without play transversely of the direction of travel. On the other feed slide the machine gantry is mounted with play transversely of the direction of travel. The bearing which exhibits play, forming a floating bearing for the direction transverse of the direction of travel, comprises on the machine gantry an elongate hole extending with its longitudinal axis transversely of the direction of travel and, on the feed slide in question, a bolt engaging in the elongate hole. The bolt provided on the feed slide is inserted into the elongate hole on the machine gantry without play in the direction of travel.

SUMMARY

Certain devices described herein advantageously ensure durably play-free mounting in the direction of travel of a supporting structure on a floating bearing of the supporting structure.

In some embodiments, a bearing projection and a receptacle wall of a bearing receptacle of a bearing arrangement acting as a floating bearing in a guide transverse direction are preloaded towards one another in the direction of travel and, through the effect of this preloading, can be readjusted relative to one another in the direction of travel. As a result of the features, the bearing arrangement acting as a fixed bearing in the direction of travel readjusts itself automatically. This ensures durable mutual play-free support of the bearing projection and the receptacle wall of the bearing receptacle in the direction of travel. Play-free mounting in the direction of travel is in particular also not impaired by wear of the bearing projection and/or wear of the receptacle wall of the bearing receptacle.

In some embodiments, a multipart construction is provided for the bearing projection and/or for the receptacle wall of the bearing receptacle. Mutual play-free support of the bearing projection and the receptacle wall of the bearing receptacle is realized by a loading element, which is supported on an associated base. This multipart nature also opens up the possibility of adapting the machine element which ultimately ensures mutual play-free mounting of the bearing projection and the receptacle wall of the bearing receptacle, namely the loading element, to the requirements of the particular application and if necessary, for instance due to wear, of replacing it with a replacement part.

In further embodiments, the loading element is supported on the associated base in the manner of a wedge transmission. A wedge face inclined in the direction of travel is provided on the loading element and/or on the associated base. The loading element is acted on by a preloading means. The wedge face(s) make(s) it possible to disperse major loads acting in the direction of travel despite the space-saving construction of the wedge transmission. For mutual readjustment of the bearing projection and the receptacle wall of the bearing receptacle in the direction of travel, the loading element moves under the effect of the preloading means along the wedge face(s) relative to the associated base and perpendicular to the direction of travel.

In further embodiments, movement of the loading element in the opposite direction and thus undesired loosening of the play-free mutual support of the bearing projection and the receptacle wall of the bearing receptacle in the direction of travel is prevented in that the loading element is supported in a self-locking manner on the associated base against movement effected relative to the base along the wedge face(s). The self-locking support may be realized by appropriate selection of the wedge angle of the wedge face on the loading element and/or the wedge face on the base associated with the loading element.

Two loading elements supported on an associated base and readjustable in the direction of travel relative to the respective other bearing part can be provided on the bearing projection and/or on the receptacle wall of the bearing receptacle, the loading elements being located opposite one another on the base in question. Mutual readjustment of the bearing projection and the receptacle wall of the bearing receptacle is accordingly divided between two loading elements. Consequently, each of the loading elements has in particular only to provide some of the readjusting travel needed overall.

So that uniform conditions prevail at both loading elements, in further embodiments, the loading elements, which are provided on mutually opposing sides of the associated base in the direction of travel, are coupled together mechanically. As a result of the mechanical coupling, the loading elements perform movements for readjusting the mutual support of the bearing projection and the receptacle wall of the bearing receptacle jointly and by a matching amount.

The mounting, play-free in the direction of travel and floating in the guide transverse direction, of the supporting structure on the guide unit allows the supporting structure to effect swiveling movements relative to the guide unit about an axis which extends perpendicular to the plane defined by the direction of travel and the guide transverse direction. Such swiveling movements of the supporting structure are performed for example when offset arises undesirably in the direction of travel at the guide units already offset relative to one another in the guide transverse direction.

Such mutual offset of the guide units spaced from one another in the guide transverse direction may arise in particular in the case, significant in terms of day-to-day operation in which each of the two guide units is moved in the direction of travel by its own drive motor and the drive motors of the guide units are not connected together mechanically. A machine gantry of the machine tool can be provided as the supporting structure.

DETAILED DESCRIPTION

Figure 1:
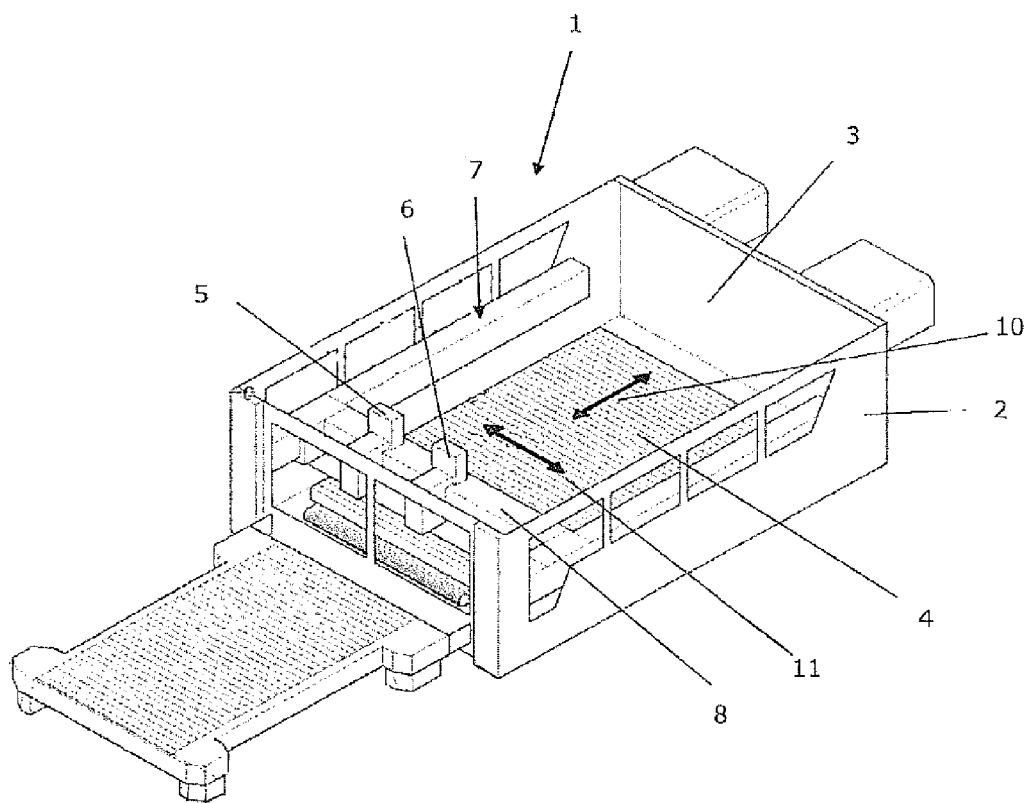
FIG. 1 shows the fundamental structure of a laser-cutting machine with a movement unit.

As shown in FIG. 1 a machine tool in the form of a laser cutting machine 1 for sheet metal working has a working area 3 defined by a housing 2. A work support 4 of conventional design is arranged in the working area 3, which supports a metal sheet to be worked and also supports the products of sheet metal working. For simplicity's sake, FIG. 1 does not show metal sheets to be worked or products produced by sheet metal working.

For cutting machining, a metal sheet supported on the work support 4 is passed over by laser cutting heads 5, 6. The laser-cutting heads 5, 6 form functional units of the laser cutting machine and are moved by a movement unit 7 of the laser-cutting machine 1. The movement unit 7 includes a supporting structure in the form of a machine gantry 8 spanning the work support 4 and a guide means 9 (shown in detail in FIG. 2). The guide means 9 guides the machine gantry 8 in the direction of travel 10.

The laser cutting heads 5, 6 are displaceable on the machine gantry 8 by drive motors in a guide transverse direction 11. The machine gantry 8 is moved jointly in the direction of travel 10 with the laser cutting heads 5, 6. To this end, a linear motor of conventional design is provided at each of the longitudinal ends of the machine gantry 8. The linear motors of the machine gantry 8 are not shown in FIGS. 1 to 6 for the sake of simplicity.

The part of each linear motor of the machine gantry 8 moved in the direction of travel 10 is connected with a guide unit of the guide means 9. The guide units of the guide means 9 take the form of feed slides 12, 13, shown schematically in FIG. 2. In place of the feed slides 12, 13, any feed carriages of conventional construction can be provided. The feed slides 12, 13 are guided movably in the direction of travel 10 on stationary longitudinal guides 14, 15 of the guide means 9. The longitudinal guides 14, 15 are spaced apart from one another in the guide transverse direction 11 and thereby form a space therebetween, in which the work support 4 of the laser-cutting machine 1 is arranged. The feed slides 12, 13 are mounted on the longitudinal guides 14, 15 without play in the guide transverse direction 11.

Figure 2:
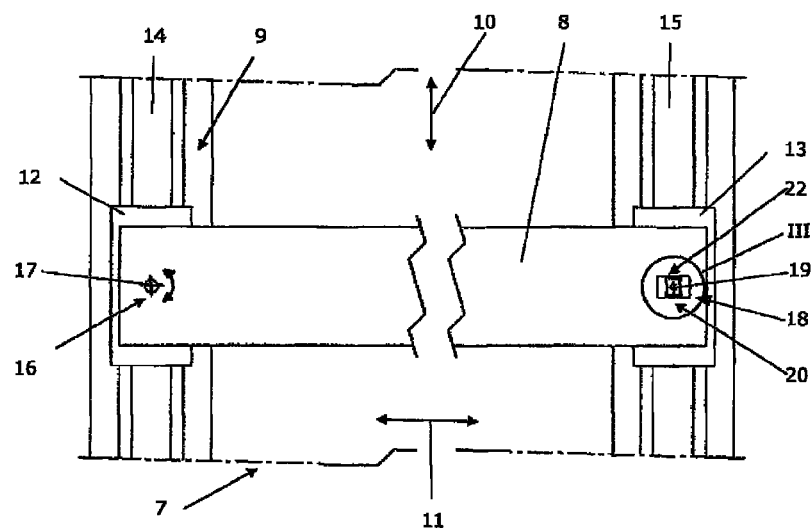
FIG. 2 shows the movement unit of the laser-cutting machine of FIG. 1 in a schematic plan view.

The feed slides 12, 13 in turn are mounted on the machine gantry 8. In this respect, a first bearing means 16 provided for mounting the machine gantry 8 on the feed slide 12 solely allows a swiveling movement of the machine gantry 8 relative to the feed slide 12. An axis 17, about which the machine gantry 8 may swivel relative to the feed slide 12, extends perpendicular to the horizontal plane defined by the direction of travel 10 and the guide transverse direction 11. The swivelability of the machine gantry 8 about the axis 17 is indicated in FIG. 2 by a curved double-headed arrow. In both the direction of travel 10 and the guide transverse direction 11 the first bearing means 16 forms a fixed bearing, which accordingly supports the feed slide 12 and the machine gantry 8 on one another without play in both the direction of travel 10 and the guide transverse direction 11.

A second bearing means 18 at the opposing longitudinal end of the machine gantry 8 differs from the first bearing means 16 in that, unlike the first bearing means 16, it allows movement of the machine gantry 8 relative to the feed slide 13 in the guide transverse direction 11. In the guide transverse direction 11 the second bearing means 18 consequently forms a floating bearing for the machine gantry 8. Beyond that, like the first bearing means 16, the second bearing means 18 acts as a fixed bearing in the direction of travel 10 and also allows swiveling movement of the machine gantry 8 relative to the associated guide unit of the guide means 9. An axis 19, about which the machine gantry 8 may swivel relative to the feed slide 13, is indicated in FIG. 2. The axis 19 also extends perpendicular to the horizontal plane defined by the direction of travel 10 and the guide transverse direction 11.

FIGS. 3 to 6 show how the fixed bearing function in the direction of travel 10 and the floating bearing function in the guide transverse direction 11 are combined structurally together in the case of the second bearing means 18.

Figure 3:
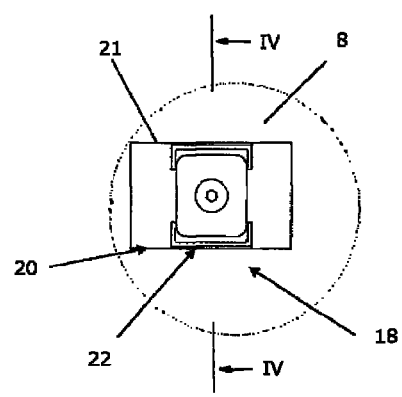
FIG. 3 shows an enlarged representation of detail III of FIG. 2.
Figure 4:
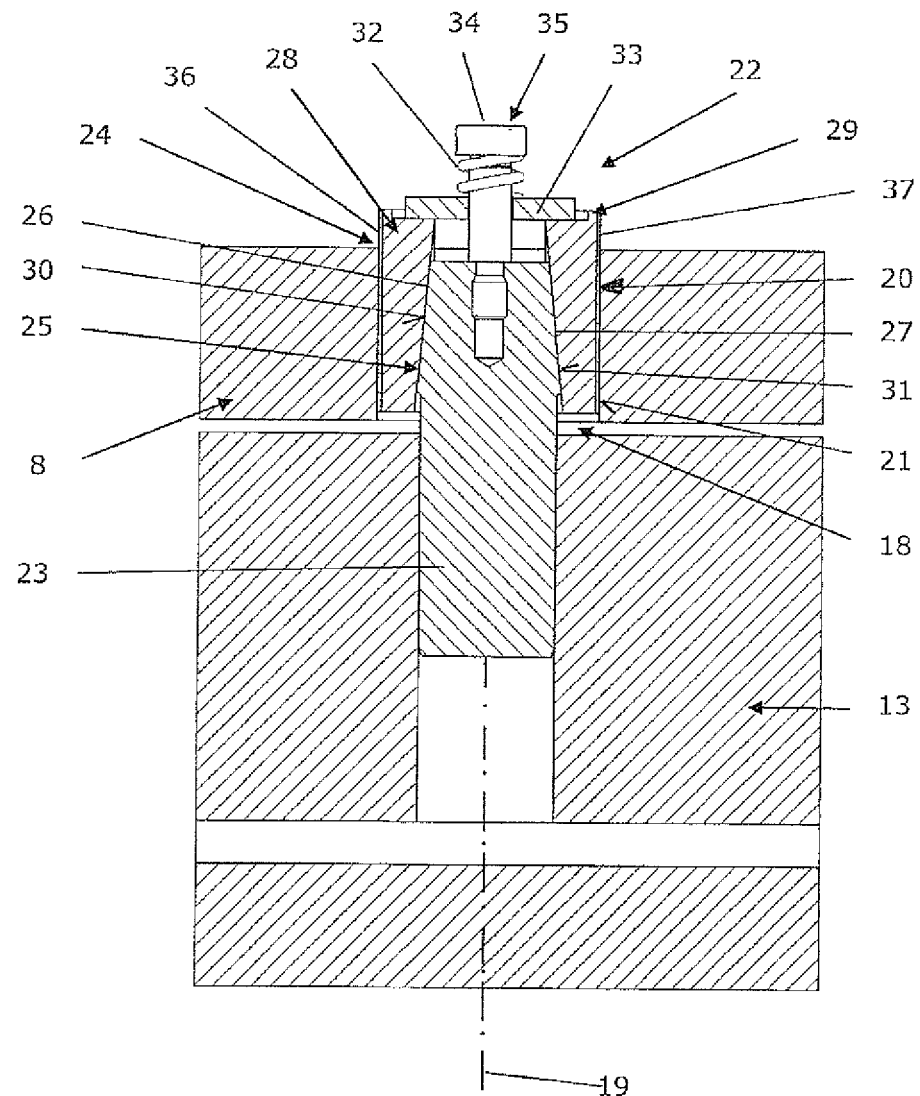
FIG. 4 shows a sectional representation of the arrangement of FIG. 3 in a section plane extending perpendicularly to the plane of the drawing in FIG. 3 along line IV-IV.

As shown in FIGS. 3 and 4, the second bearing means 18 includes as its supporting structure-side bearing part a bearing receptacle provided on the machine gantry 8 in the form of a slide channel 20 with a channel wall 21 forming a receptacle wall. The guide-side bearing part of the second bearing means 18 takes the form of a bearing projection in the form of a driver 22 provided on the feed slide 13. The driver 22 is fitted without play into the feed slide 13 by a cylindrical bearing pin 23. The cylindrical bearing pin 23 is mounted rotatably on the feed slide 13, along the axis 19.

The driver 22, connected with the feed slide 13, engages with a gantry-side part 24 in the slide channel 20 on the machine gantry 8. Specifically, the gantry-side part 24 of the driver 22 includes a projection base 25 with projection wedge faces 26, 27 on opposing sides, in the direction of travel 10, of the projection base 25. Projection clamping elements in the form of loading wedges 28, 29 are associated with the projection base 25. The loading wedge 28 lies with a loading wedge face 30 against the projection wedge face 26, while the loading wedge 29 lies with a loading wedge face 31 against the projection wedge face 27 of the projection base 25. Perpendicular to both the direction of travel 10 and the guide transverse direction 11, the loading wedges 28, 29 are acted on by a pressure spring 32 serving as a preloading means. The pressure spring 32 is loaded between a pressure plate 33 resting on the loading wedges 28, 29 and the bottom of a bolt head 34 of a fit bolt 35. The fit bolt 35 is screwed with its thread into an internal thread on the projection base 25.

The loading wedges 28, 29 and the bilaterally wedge-shaped projection base 25 form a wedge transmission. Through the effect of the action of the pressure spring 32, the loading wedges 28, 29 are urged to move with their loading wedge faces 30, 31 along the projection wedge faces 26, 27 of the projection base 25. As a result of the wedge effect, the loading wedges 28, 29 are preloaded against the channel wall 21 of the slide channel 20. On their side facing the channel wall 21 the loading wedges 28, 29 are provided with sliding coatings 36, 37.

The preloading of the loading wedges 28, 29 against the channel wall 21 is such that in the direction of travel 10 play-free support of the driver 22 against the channel wall 21 is ensured, and thus play-free mounting in the direction of travel 10 of the machine gantry 8 on the feed slide 13. At the same time, the preloading of the loading wedges 28, 29 against the channel wall 21 in the guide transverse direction 11 allows movement of the channel wall 21 relative to the loading wedges 28, 29 and thus movement of the machine gantry 8 relative to the feed slide 13. The sliding coatings 36, 37 of the loading wedges 28, 29 make it easier for the machine gantry 8 to move in the guide transverse direction 11 relative to the feed slide 13.

The action of the pressure spring 32 on the loading wedges 28, 29 ensures that the preloading of the loading wedges 28, 29 against the channel wall 21 and consequently also the play-free support of the machine gantry 8 on the feed slide 13 is retained in the direction of travel 10 even in the case of wear of the loading wedges 28, 29, for instance wear of the sliding coatings 36, 37. In such cases, through the effect of the pressure spring 32, the loading wedges 28, 29 with their loading wedge faces 30, 31 are moved along the projection wedge faces 26, 27 of the projection base 25, and through the resultant wedge effect, are readjusted in the direction of travel 10 relative to the channel wall 21 of the slide channel 20.

The size of the wedge angle at the loading wedges 28, 29 and at the projection base 25 is selected such that the loading wedges 28, 29 can if necessary be readjusted sufficiently far in the direction of travel 10 and at the same time enable self-locking of the loading wedges 28, 29 at the wedge faces 26, 30 and 27, 31 in contact with one another against movement relative to the projection base 25, which movement would otherwise be caused by forces acting in the direction of travel 10 between the machine gantry 8 and the feed slide 13 and carried out against the action of the pressure spring 32.

Figure 5:
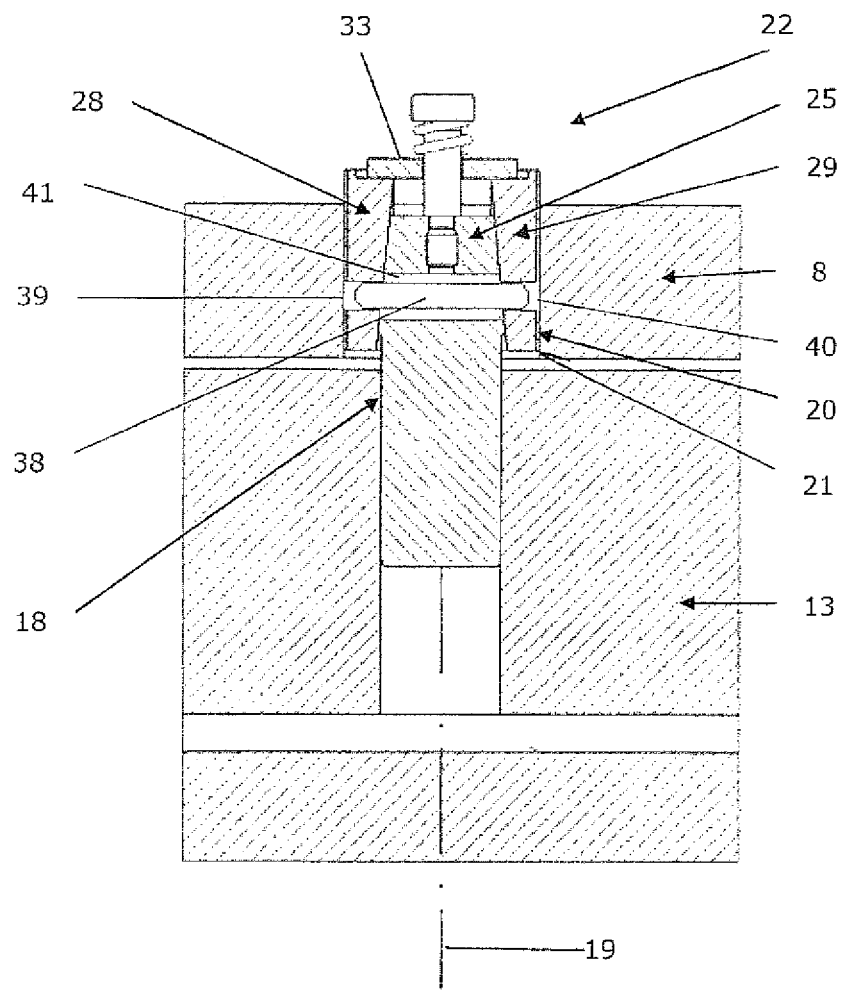
FIGS. 5 and 6 show alternatives to the arrangement of FIGS. 3 and 4.

Shown in FIG. 5 is a further embodiment in which the loading wedges 28, 29 are coupled together mechanically. The mechanical connection between the loading wedges 28, 29 is in this case brought about by a connecting pin 38, which engages with its ends in a longitudinally mobile manner in bores 39, 40 on the loading wedges 28, 29 and is guided at the projection base 25 in an elongate hole 41 in the projection base 25 so as to be movable in the direction of the axis 19. The mechanical connection between the loading wedges 28, 29 produced by the connecting pin 38 ensures, in addition to the pressure plate 33 acting on the loading wedges 28, 29, that the loading wedges 28, 29 travel matching distances in the event of readjusting movement in the direction of the axis 19. Centering of the driver 22 inside the slide channel 20 is additionally ensured thereby.

Figure 6:
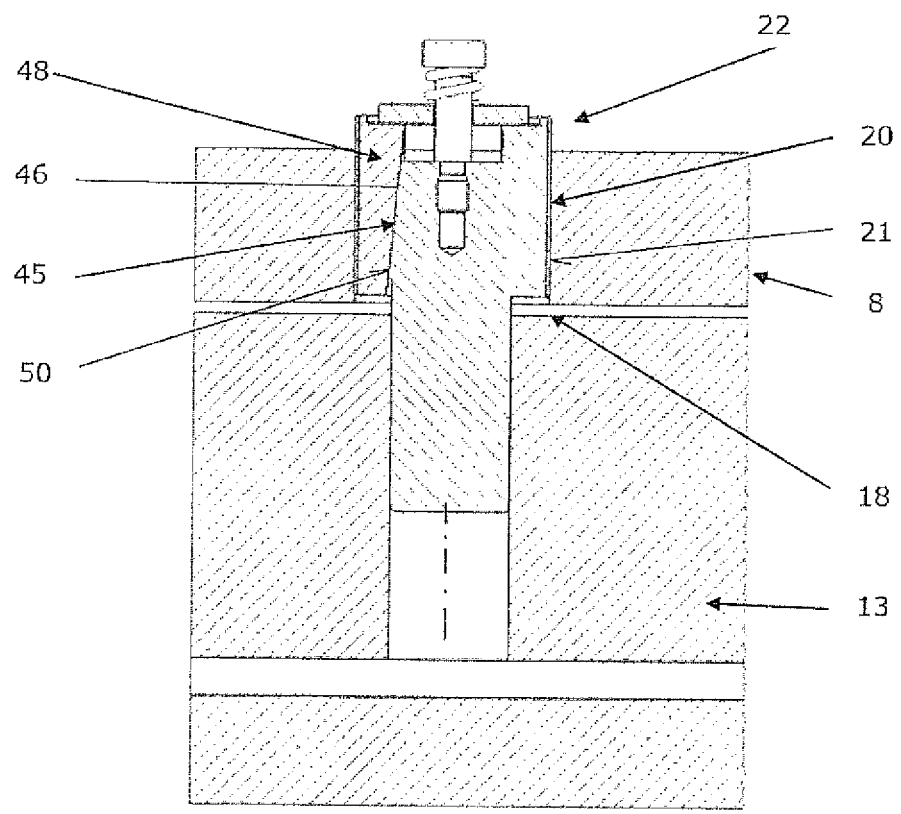

FIG. 6 shows a further embodiment of the second bearing means 18 in which a projection base 45 of the driver 22 is provided with a wedge face 46 only on one of its sides situated in the direction of travel 10 and which makes use of just one single loading wedge 48 with a wedge face 50. A readjusting movement is accordingly performed only at one of the sides of the driver 22 situated in the direction of travel 10. On the opposite side from the loading wedge 48 in the direction of travel 10, the driver 22 is supported with the projection base 45 against the machine gantry 8 without the interposition of a loading element. By supporting the projection base 45 directly against the channel wall 21 of the slide channel 20, the position of the driver 22 and thus also of the feed slide 13 relative to the machine gantry 8 is constant and in particular defined independently of any readjusting movement of the loading wedge 48. The projection base 45 also includes a sliding coating on the machine gantry side.

A number of embodiments of the invention have been described. Nevertheless, it will be understood that various modifications may be made without departing from the spirit and scope of the invention. Accordingly, other embodiments are within the scope of the following claims.

What is claimed is:

1. A movement unit for a machine tool, comprising:
   a supporting structure movable in a first direction for supporting a functional unit of the machine tool;
   two longitudinal guides extending in the first direction and arranged offset relative to one another in a second direction that is transverse to the first direction;
   a guide unit mounted on each longitudinal guide, each guide unit being movable relative to the longitudinal guides in the first direction and not movable relative to the longitudinal guides in the second direction; and
   a bearing structure which connects the supporting structure to one of the guide units such that the supporting structure is not movable relative to the guide unit in the first direction and is movable relative to the guide unit in the second direction, the bearing structure comprising:
      a bearing receptacle associated with one of the supporting structure and the guide unit, the bearing receptacle having a receptacle wall extending in the second direction, and
      a bearing projection associated with the other one of the supporting structure and the guide unit which engages the bearing receptacle, wherein the bearing projection and the receptacle wall are preloaded towards one another in the first direction, the bearing projection and the receptacle wall thus being supported against one another to prevent motion of the bearing projection and the receptacle wall relative to one another in the first direction, and wherein the bearing projection and the receptacle wall are movable relative to one another in the second direction.

2. The movement unit according to claim 1, wherein the bearing receptacle has a size in the second direction that is larger than a size of the bearing projection in the second direction.

3. The movement unit according to claim 1, wherein the bearing projection comprises:
   a projection base connected with the supporting structure or with the guide unit, and
   a projection loading element,
   wherein the projection loading element and the projection base are supported by one another in the first direction, and
   wherein the projection loading element can be adjusted relative to the projection base for maintaining the mutual support of the bearing projection and the receptacle wall to prevent motion of the bearing projection and the receptacle wall relative to one another in the first direction.

4. The movement unit according to claim 3, wherein at least one of the projection loading element and the projection base has a wedge face inclined in the first direction, wherein the projection loading element and the projection base are supported by one another in the first direction at the wedge face(s), and wherein the projection loading element is loaded in the first direction towards the receptacle wall of the bearing receptacle.

5. The movement unit according to claim 4, comprising a compressive element which is configured to provide a compressive force acting on the projection loading element in a direction perpendicular to the first and second directions such that the projection loading element is movable in the direction perpendicular to the first and second directions relative to the projection base and thereby adjustable by the wedge face(s) in the first direction relative to the projection base.

6. The movement unit according to claim 5, wherein the projection loading element and the projection base are supported by one another in the first direction in a self-locking manner at the wedge face(s) against movement of the projection loading element along the wedge face(s) relative to the projection base under a force acting in the first direction.

7. The movement unit according to claim 1, wherein the bearing projection comprises a projection loading element on each of mutually opposing sides of a projection base of the bearing projection in the first direction, wherein each of the projection loading elements is supported against the projection base and can be adjusted in the first direction relative to the projection base.

8. The movement unit according to claim 7, wherein the projection loading elements on the mutually opposed sides of the projection base are connected to each other, thus being jointly movable perpendicular to the plane defined by the first direction and the second direction.

9. The movement unit according to claim 1, wherein the bearing projection is rotatably connected with the supporting structure or with the guide unit about an axis extending perpendicular to the plane defined by the first direction and the second direction.

10. The movement unit according to claim 1, wherein each of the two guide units is movable in the first direction by a drive motor on the associated longitudinal guide and wherein the drive motors of the guide units are decoupled mechanically from one another.

11. The movement unit according to claim 1, wherein a machine gantry of the machine tool is provided as the supporting structure.

12. A machine tool with a movement unit, wherein the movement unit is constructed according to claim 1.

* * * * *